March 9, 1965 U. J. SCHMID 3,172,545
CASE UNSTACKING AND CONVEYING APPARATUS
Filed Jan. 30, 1961 12 Sheets-Sheet 1

INVENTOR.
Ulrich J. Schmid
BY
Attorneys

INVENTOR.
Ulrich J. Schmid

Attorneys

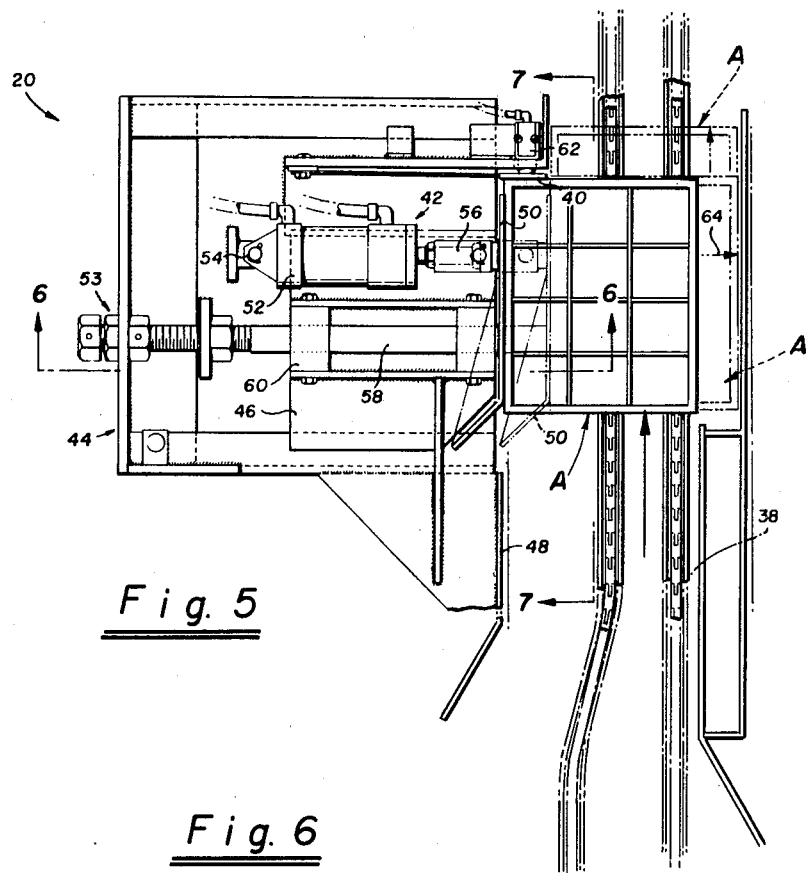
Fig. 5
Fig. 6
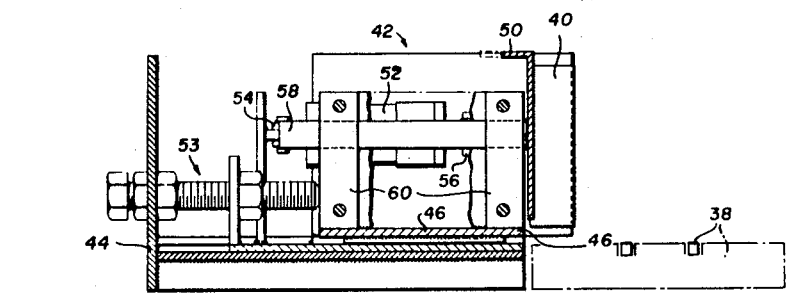
Fig. 7
INVENTOR.
Ulrich J. Schmid
Attorneys

March 9, 1965 U. J. SCHMID 3,172,545
CASE UNSTACKING AND CONVEYING APPARATUS
Filed Jan. 30, 1961 12 Sheets-Sheet 5

INVENTOR.
Ulrich J. Schmid
BY
Attorneys

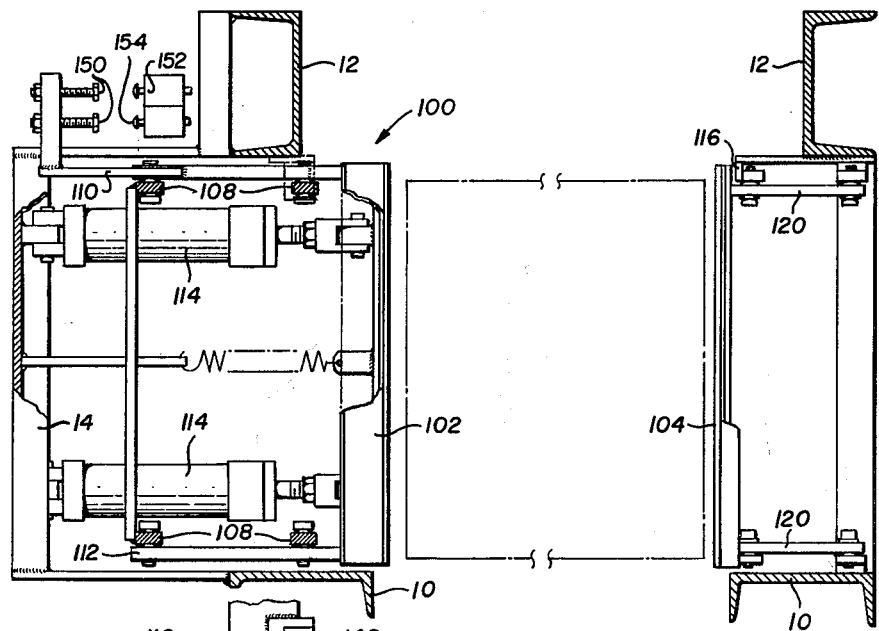
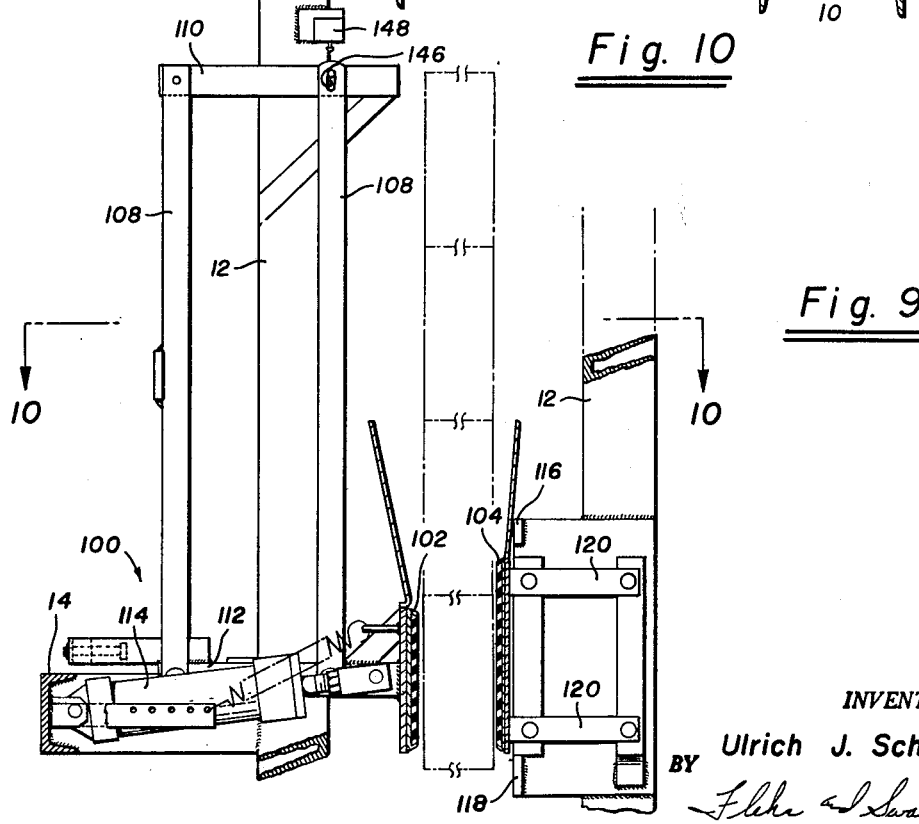
Fig. 10
Fig. 9

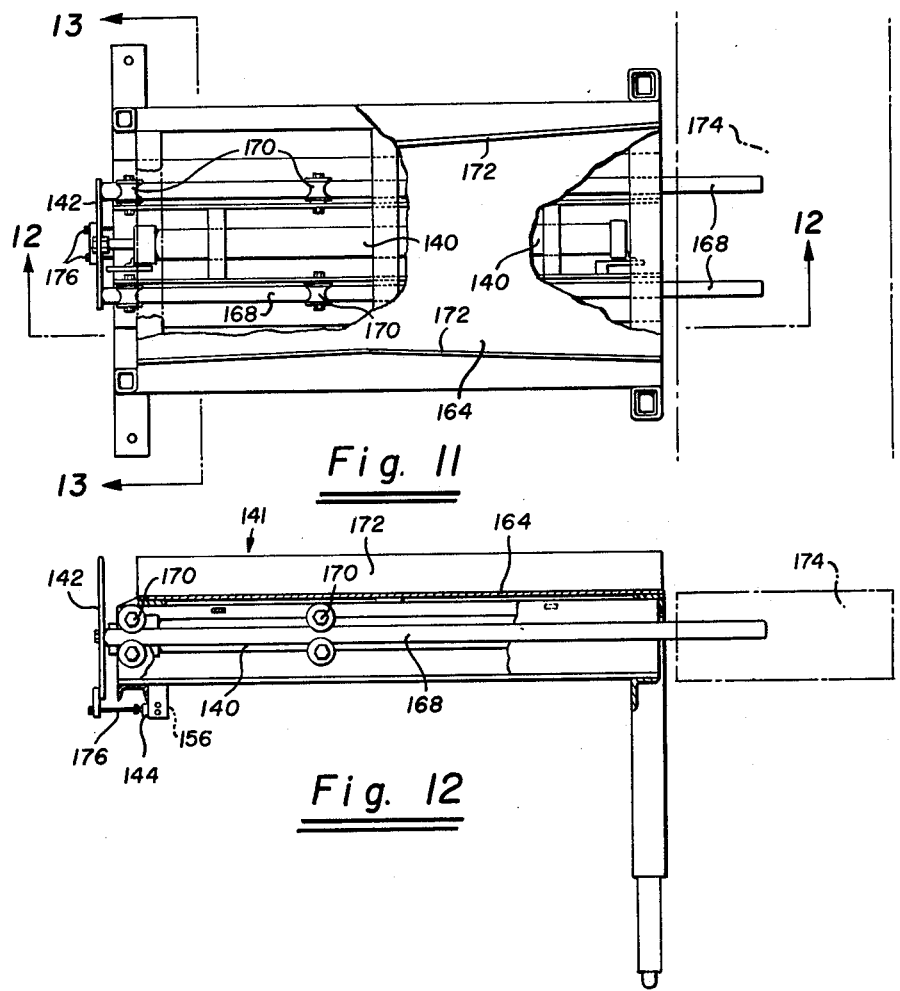
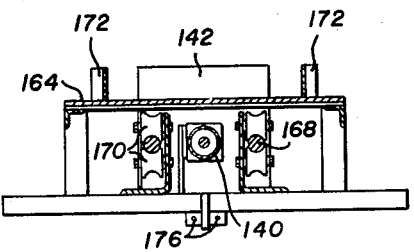

INVENTOR.
Ulrich J. Schmid
BY
Attorneys

INVENTOR.
Ulrich J. Schmid
BY
Attorneys

INVENTOR.
Ulrich J. Schmid
Attorneys

March 9, 1965 U. J. SCHMID 3,172,545
CASE UNSTACKING AND CONVEYING APPARATUS
Filed Jan. 30, 1961 12 Sheets-Sheet 11

INVENTOR.
Ulrich J. Schmid
BY
Attorneys

March 9, 1965 U. J. SCHMID 3,172,545
CASE UNSTACKING AND CONVEYING APPARATUS
Filed Jan. 30, 1961 12 Sheets-Sheet 12

INVENTOR.
Ulrich J. Schmid
BY
Attorneys

United States Patent Office 3,172,545
Patented Mar. 9, 1965

3,172,545
CASE UNSTACKING AND CONVEYING
APPARATUS
Ulrich J. Schmid, Dallas, Tex., assignor to Foremost Dairies, Inc., San Francisco, Calif., a corporation of New York
Filed Jan. 30, 1961, Ser. No. 85,878
7 Claims. (Cl. 214—8.5)

This invention relates generally to unstacking and conveying apparatus and is particularly concerned with lightweight compact machines of this character adapted to receive stacks of cases at floor level and to deposit the cases singly at such level or at an elevated working level.

Case unstacking machines of the type used, for example, in the dairy, citrus, and bottling industries, generally require a pit to house various portions of the mechanism such as the hydraulic mechanism for the elevator, conveyor mechanism, etc. This type construction presents a number of problems. Principal among these are increased initial cost and inflexibility of use of the machine in subsequent operations. Changes in the positioning or use of the unstacking mechanism, such as frequently encountered in modernization and revamping programs, are consequently accomplished only with difficultly and at great expense. This is a particular handicap of small concerns with limited resources, where multiple use of purchased equipment is often essential.

A further problem resides in the multiple conveyors that are required for changes in level. These extra conveyors occupy valuable space and generally require added labor to insure their proper utilization. They also complicate synchronization and control of the operations involving the machines.

In general, it is an object of the present invention to provide a case unstacking and conveying mechanism which efficiently receives successive stacks of cases for separation and deposit singly upon a discharge conveyor, and which does so quickly, easily and automatically.

It is a further object of the invention to provide a case unstacking and conveying mechanism that is simple in construction, light in weight and which occupies a minimum of floor space.

Another object of the invention is to provide a mechanism of this type which can be readily positioned in a plant operation to receive successive stacks of cases from a feeding line at a floor or shipping level, which will separate such stacks into individual cases for deposit at a working height, and then discharge the individual cases at such level for further conveyance in a substantially automatic fashion.

Other objects and advantages of the invention will be apparent from the following description of a preferred embodiment thereof as illustrated in the accompanying drawing in which:

FIGURE 5 is an enlarged view in plan of a stack feeding station in the machine;

FIGURE 6 is a view in section along the line 6—6 of FIGURE 5;

FIGURE 7 is a view in side elevation taken along the line 7—7 of FIGURE 5;

FIGURE 9 is a view in elevation of a case supporting and holding mechanism used in conjunction therewith;

FIGURE 10 is a view in horizontal section along the line 10—10 of FIGURE 9;

FIGURE 11 is a view in top plan, with parts broken away, illustrating a case discharging station in the machine;

FIGURE 12 is a view in vertical section along the line 12—12 of FIGURE 11;

FIGURE 13 is a like view along the line 13—13 of FIGURE 11;

Figure 1:
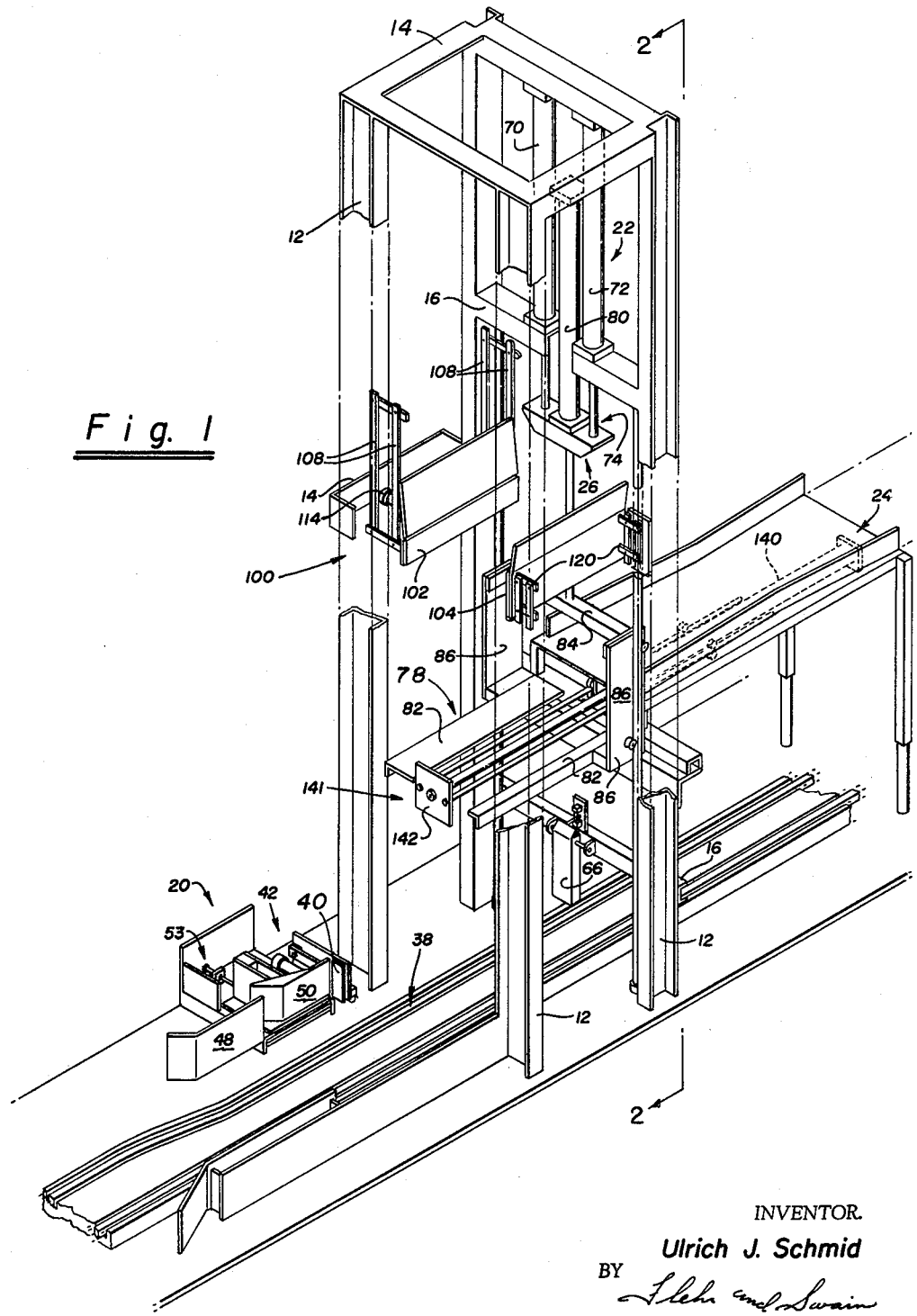
FIGURE 1 is a view in perspective of a machine embodying the invention.
Figure 2:
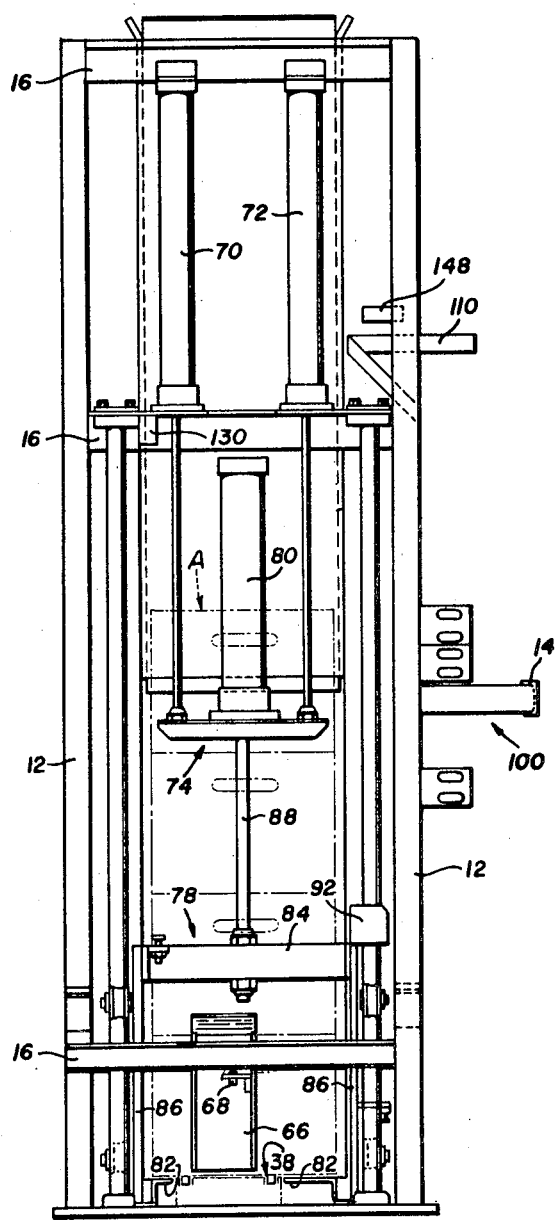
FIGURE 2 is a view in section along the line 2—2 thereof.
Figure 3:
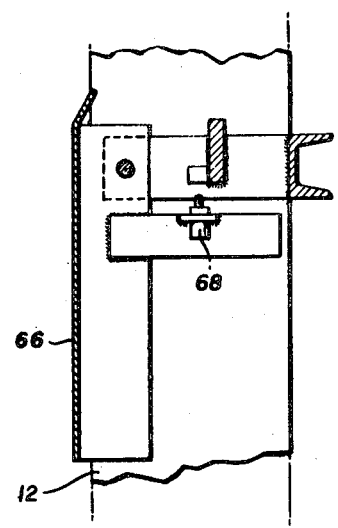
FIGURE 3 is a detail view illustrating an internal actuator mechanism within the machine.

In general, the case unstacking and conveying mechanism of the present invention is adapted to operation in conjunction with casing equipment in a wide variety of industries. By way of illustration, the machine can be employed in a warehouse or factory receiving station to receive stacks of cases for delivery of individual cases to a filling machine, or to a case or bottle washing machine, or to various other plant or warehouse operations. The machine performs the function of recieving stacks of cases, successively elevating the stacks into the machine, and then depositing the lower case of the stack, one at a time, on a discharge conveyer. When the stack has been broken down and discharged in this manner, a new stack is fed into the machine for separation and deposit on the discharge conveyer as before. In a preferred embodiment of the machine, the stacks are received at a convenient stack handling level (e.g. about 8 to 20 inches above the floor) and broken down and delivered at a convenient working level (e.g. about 3 feet above the floor).

A preferred embodiment of the machine, illustrated in FIGURES 1 to 12, comprises a frame including vertical side frames 10 and 12 suitably connected with cross bracing 14 and transverse supports 16, and a bottom or base support 18. The frame serves to support various operating stations within the machine including a stack retarding and feeding station 20 employing a stack transfer mechanism, an unstacking station 22 employing a stack holding assembly in association with an unstacking elevator, a discharge station 24 making use of a case transfer mechanism, and a step-up assembly 26 adapted to operate in synchronized relaship with the various elevators and transfer mechanisms of the machine. As will appear, the machine functions to receive stacks of cases from a receiving dock and to hold each stack of cases at the station 20 until the machine has been cleared to receive it. Upon delivery of a stack from the station 20, the stack is elevated to a position in front of the discharge station 24. The unstacking elevator and associated stack holding assembly at the unstacking station 22 function to separate and deliver the individual cases to the transfer mechanism of the discharge station 24. The latter delivers and deposits each individual case on a discharge conveyer from whence it is moved to a filling station or to other desired plant locations.

The machine illustrated in FIGURES 1 to 12 is designed for operation in conjunction with a pneumatic system employing compressed air or other gaseous fluid. Fluid pressure is supplied by a power cylinder (not shown) to the main supply line 30 (FIGURES 1 to 12) and at a constant pressure. This line delivers the air through various purifying apparatus 32, and at desired pressure, to a manifold 34. The latter supplies pressure to various valves, air locks, bleeding poppets, operating cylinders, and other units of the control system of the machine. If desired, the machine can also be designed to operate in conjunction with a hydraulic system in which oil, water or other liquid is employed as the hydraulic fluid.

*The stack feeding station*

The stack retarding and feeding station 20 (FIGURES 1, 4 and 14) operates in conjunction with a feed conveyer 38 to receive stacks of cases and to retain them at the station 20 until the machine is ready to receive them.

As generally illustrated in FIGURES 4 to 7, the station 20 includes a stop plate 40 adapted to retard movement of the stacks of cases on the conveyer 38, and a stack transfer mechanism 42 adatped to meter the stacks of cases into the machine, one stack at a time, by shoving them past the stop 40. More specifically, the station 20 comprises a base assembly 44 mounting the stop plate 40, and a slide assembly 46 mounting the transfer mechanism 42. This construction provides for adjustment of components of the slide assembly relative to the conveyer, including both the inlet guide plate 48 and the push plate 50 of the transfer mechanism. Ajustment can be readily obtained, for example, by means of the screw assembly 53.

The transfer mechansim 42 includes a transfer air cylinder 52 pivotally supported at one end 54 on the slide assembly, and attached at the other end by a clevis fitting 56 to the push plate. The push plate is supported on the slide fitting by means of a slide bar 58 attached thereto and received in the upstanding supports 60, likewise carried by the slide mount. The guide plate 48 and the push plate 50 are mounted on the slide assembly so as to be in substantial alignment, and are positioned relative to the conveyer 38 by contact of the screw assembly 53 with the rear support 60.

When the stop plate 40 is engaged by a stack, it performs a secondary function of bleeding a poppet or valve actuator 62 positioned behind the stop plate. When unstacking operations at the station 22 have been completed (with respect to a preceding stack of cases), the step-up assembly 26 returns the unstacking elevator 78 to the lower or dotted position of FIGURE 4 to receive a new stack. It also engages an interlock 63 in the control system, and thereby cooperates with the actuator 62 to shift the valve 65 for the transfer cylinder 52. The latter extends the push plate 50 to shove the entering stack sideways on the conveyer 38, as indicated by the arrow 64 in FIGURES 4 and 5. Once clear of the stop 40, the stack is free to move with the conveyer 38 onto the unstacking elevator at station 22. This general operation is illustrated in FIGURE 5 by the full and dotted line positions of the entering stack of cases A.

Within the machine, the stack hits the internal actuator plate 66 causing it to engage the valve actuator 68. The latter functions to shift the valve 65 for the transfer cylinder 52, causing the push plate 50 to return to its original position. The next stack in sequence is thereby enabled to advance into a position in contact with the stop 40 awaiting the next sequence.

*The step-up assembly*

The step-up assembly 26 (FIGURES 2, 4 and 8) includes a pair of operating cylinders 70 and 72 mounted on a cross support 16 and supporting a yoke assembly 74. The yoke 74 provides a vertically movable mount for the air cylinder or hoist mechanism 80 of the unstacking elevator 78, and permits the edge supports 82 of this elevator to be positioned at floor level to receive a stack carried into the machine by the feed conveyer 38.

Contact of the entering stack with the internal actuator plate 66 causes the valve actuator 68 to shift the valve 69 for the cylinders 70 and 72, and the lifting yoke 74 to raise the unstacking elevator 78 to initiate the stack lifting operation. The stroke of the step-up cylinders 70, 72 is just sufficient to raise the unstacking elevator to a position where the edge supports 82 are in alignment with the discharge conveyer at station 24. The step-up elevator thus functions to permit the unstacking elevator to discharge individual cases at a desired working level for subsequent plant operations.

*The unstacking station*

As previously indicated, the unstacking station 22 includes an unstacking elevator 78, and a stack holding assembly 100 adapted to cooperate with the unstacking elevator. In general, the unstacking station operates to repetitively lift the entering stack of cases and to deposit the lowermost case, in succession, upon a transfer mechanism associated with a discharge station 24.

Figure 14:
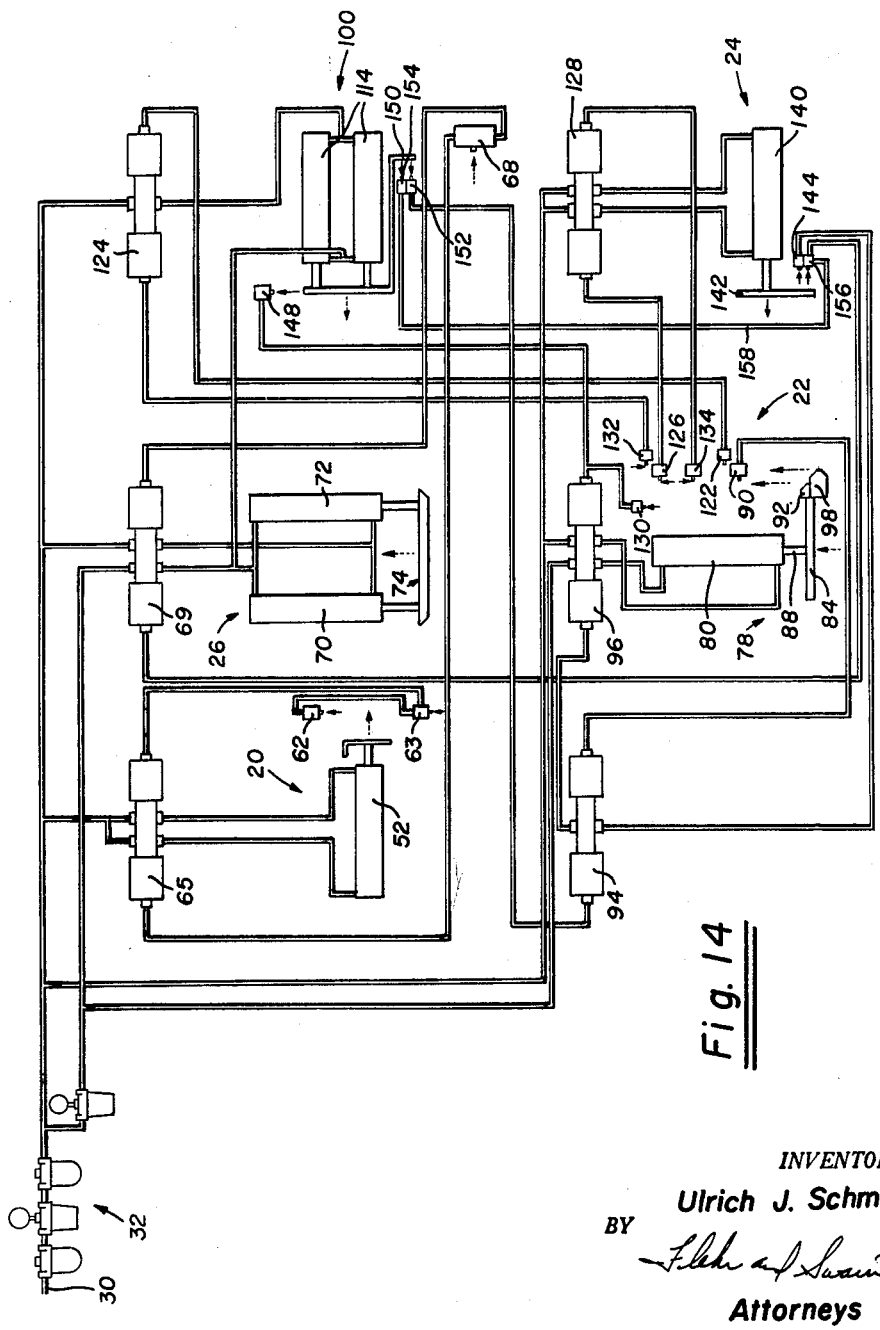
FIGURE 14 is a schematic view illustrating a control system employed with the machine of FIGURE 1.

In the machine of FIGURES 1 to 14, the unstacking elevator comprises the pair of spaced apart edge supports 82 mounted on the cross bar 84 by means of the spaced apart side plates 86. The cross bar is in turn supported by the vertically movable rod 88 of the hoist cylinder 80. As represented in FIGURE 14, the air cylinder 80 is actuated to elevate the supports 82 by a one-way switch 90. The switch 90 is engaged by a cam actuator 92 carried by the cross bar 84 upon vertical movement of the step-up assembly 26. Contact with the switch 90 causes the valve 94 to shift and bleed through to valve 96 controlling the unstacking elevator. The valve 96 in turn actuates the cylinder 80 to raise the stacking elevator above the step-up position to the top of its stroke.

As will appear, the upward stroke of the step-up assembly also causes cam 98 to actuate switch 122 to retract the clamping plates of the stack holding assembly 100. The two cam actuators, 92 and 98, are responsive to subsequent operation of the unstacking elevator 78 to initiate a number of unstacking operations involving both the stack holding assembly 100 and the case transfer mechanism 141 of the discharge station 24.

The stack holding assembly 100 (FIGURES 4, 9 and 10) serves generally to engage the stack as it is moved downward in an unstacking operation to positively grip the stack above the lowermost case. It also acts to positively release the stack as it is moved upward by the unstacking elevator during each subsequent sequence. More specifically, the assembly 100 serves to grasp the case next above the first one to be unstacked, each time the unstacking elevator 78 descends in an unstacking operation, thereby holding the remainder of the stack in elevated position. As the unstacking elevator moves up and down in each subsequent unstacking operation, assembly 100 repeats the operation of grasping the case next above the one to be unstacked, thereby permitting the lowermost case to be successively delivered to the discharge station 24.

Referring to FIGURE 9, the case engaging mechanism comprises a pair of gripper or pressure plates 102 or 104, preferably faced with rubber or similar deformable material. The plate 102 is mounted for lateral movement by pairs of swing arms 108 suspended in parallel fashion on laterally extending arms 110 carried by the frame members 10 and 12. At their lower ends these swing arms are pivotally connected to support arms 112 for the pressure plate. Lateral movement of the swing arms and the pressure plate 102 is obtained by the air cylinders 114, which are pivotally connected between the pressure plate and a cross frame 14. The opposite pressure plate 104 is restrained from moving laterally, but is permitted to move vertically between the upper and lower stops 116 and 118. This movement is permitted by a simple parallelogram linkage between the plate 104 and the frame members 10, 12 provided by the pivot arms 120.

Referring to FIGURES 9 and 14, the initial upward movement of the step-up assembly 26 causes the cam actuator 98 to depress the switch 122 to shift valve 124. This causes the air cylinders 114 for the pressure plate 102 to withdraw the plate 102 so that the stack is free to pass between the plates 102, 104. Just before the unstacking elevator reaches the top of its stroke, the one way switch 126 is depressed, causing the valve 128 to shift to advance the transfer mechanism 141 of the discharge station. It should be noted that the transfer mechanism 141 is advanced at a time when a stack is above the elevation of this operation.

At the top of the stack elevating stroke, the cross bar 84 engages the switch 130 to shift the valve 96 to reverse movement of the cylinder 80. The unstacking elevator now descends causing the cam actuator 98 to engage the one-way switch 132 prior to movement of the elevator supports 82 to the step-up discharge height. The switch 132 again shifts valve 124 to advance the clamping cylinders 114 to clamp the case next above the case to be unstacked, thereby holding the remainder of the stack in elevated position above the discharge point. The unstacking elevator continues its lowering movement to the step-up discharge height, and at the end of its stroke engages the one-way switch 134. This switch functions to shift valve 128 an retract the unloading or transfer cylinder 140 of the transfer mechanism 141. As will appear, the mechanism 141 effects removal of the case remaining on the unstacking elevator to the discharge station 24, for delivery to subsequent plant operations.

The discharge operation of the cylinder 140 causes the unloading plate 142 to engage a bleeder poppet or switch 144 to first shift valve 94, and then valve 96, causing the cylinder 80 to again raise the unstacking elevator. It will be remembered that the remainder of the stack is now held supported between the plates 102 and 104 of the stack holding assembly 100. As the unstacking elevator 78 returns upward, it engages the lower surface of the stack causing upward movement of the stack and also the pressure plates 102, 104 (FIGURE 9). This movement of plate 102 is accommodated by slots 146 in the upper ends of the forward swing arms 108, permitting one of the latter to engage switch or poppet 148. Bleeding through the poppet 148 acts to shift the valve 124 to retract the air cylinders 114, causing the pressure plate 102 to be withdrawn. Simultaneously the valve 96 shifts to reverse the operation of cylinder 80 to send the stack down between the plates 102, 104 to the step-up discharge height, with resultant actuation of switch 132 to grasp the case next above the case to be unloaded, and switch 134 to discharge the lowermost case as before.

The above described operation is repeated until the last case reaches the unloading position and is removed by the plate 142 of the discharge station. In this position the clamp cylinders 114 are permitted to advance inwardly of their normal clamping position, causing the actuators 150 to engage the bleeding poppets or switches 152, 154. The poppet 152 locks out the valve 94, rendering the discharge poppet 144 inactive to again raise the unstacking elevator by the cylinder 80. Simultaneously the poppet 154 causes bleeding of poppet 156 (adjacent to 144), through line 158, so that movement of the unloading plate 142 to remove the last case from the unstacker causes the poppet 156 to shift valve 69 to send the step-up elevator 74 down to its lowermost position to receive the next stack to be unstacked.

This completes the cycle of operations at the unstacking station, as movement of the yoke 74 to its lowermost position actuates the interlock 63 (FIGURE 14) to allow the next stack to move into the unstacker.

*The discharge station*

The discharge station 24 (FIGURES 1, 4 and 11 to 13) makes use of a transfer mechanism 141 including an air cylinder 140 adapted to cooperate with a stationary discharge plate 164. The piston of the cylinder 140 mounts an unloading plate 142 of dimensions small enough to pass between the edge supports 82 of the unstacking elevator, at the step-up level, to thereby discharge cases from the unstacking elevator 78 to the discharge station.

Referring specifically to FIGURES 11 to 13, the unloading plate 142 is mounted for reciprocal movements by means of parallel rods 168 on either side of the cylinder 140. These rods are freely movable in roller supports 170. When the unstacking elevator 78 reaches the top of its stroke switch 126 is actuated by the cam 92 to extend the plate 142 to the position shown in FIGURE 4. When the elevator subsequently descends with the lowermost case (in the manner previously described), the switch 134 causes the cylinder 140 to withdraw the unloading plate 142, sliding the case from the edge supports 82 onto the discharge plate 164. As illustrated in FIGURE 11, this plate can have guide rails 172 to guide the cases onto the discharge conveyer 174.

Referring to FIGURE 12, actuators 176 for the switches 144, 156 can be mounted on the lower edge of the unloading plate 142. As previously explained, the switch 144 sends the elevator back up in the unstacking sequence. However, upon movement of the last case out of the unstacking station, the switch 144 is de-energized by the lock-out switch 152. The switch 156 then cooperates with switch 154 to lower the step-down assembly 26 to its floor level position to receive the next stack for unstacking.

*Operation*

Figure 4:
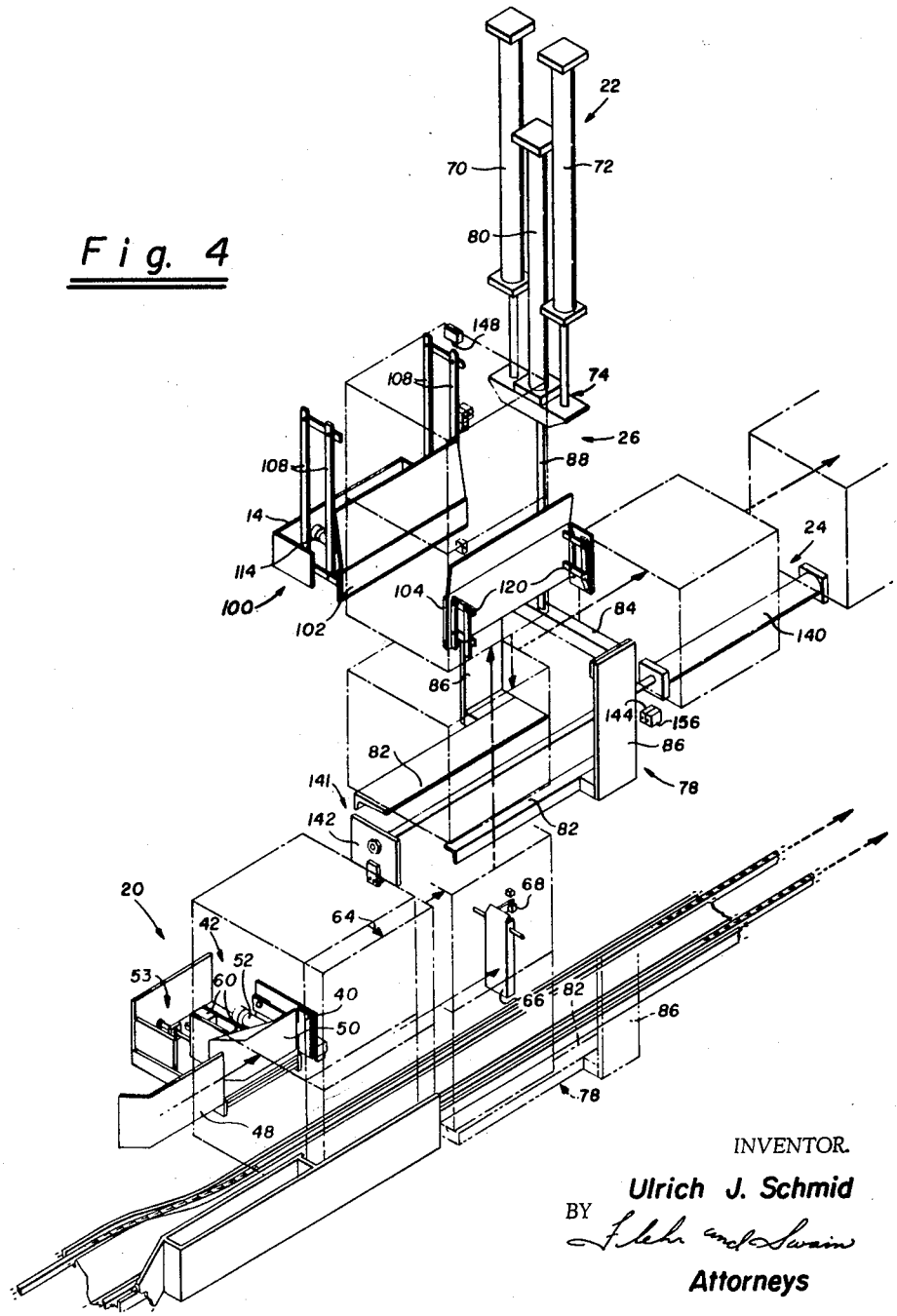
FIGURE 4 is a schematic view in perspective of essential components of the machine of FIGURE 1, illustrating the operation thereof.
Figure 8:
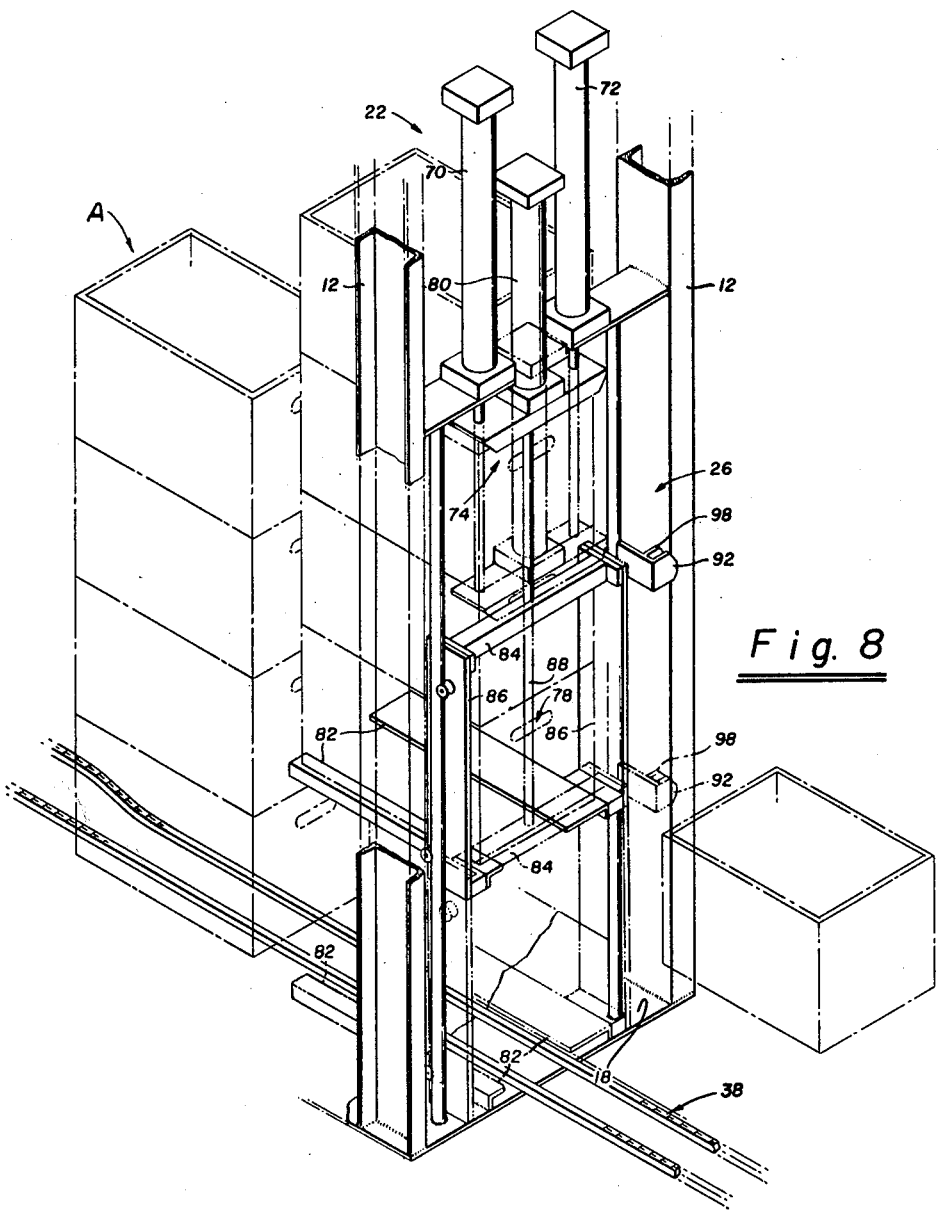
FIGURE 8 is a perspective view of a case unstacking station in the machine.

Referring particularly to FIGURES 4 and 14, the operation of the machine illustrated in FIGURES 1 to 14 can be summarized as follows:

It is assumed that a stack of cases is being held in the stack feeding station 20 by the plate 40, and that a prior unstacking sequence is being terminated by lowering of the elevator 78 to the dotted line position of FIGURE 4. This latter movement, achieved by the assembly 26, causes the yoke 74 to engage the interlock 63 associated with the valve actuator 62, reversing the valve 65. This functions to actuate the cylinder 52 of the stack transfer mechanism 42 to shove the entering stack sideways on the conveyer as indicated by the arrow 64 in FIGURE 4. This lateral movement of the stack causes it to clear the stop plate 40 and to be moved by the feed conveyer 38 into the unstacking station 22.

Within the machine, the stack hits the plate 66 energizing the internal actuator 68 to shift the valve 65 to retract the transfer cylinder 52 to its original position. The next stack in sequence will now be enabled to advance into a position in contact with the retaining plate 40.

Contact of the entering stack with the plate 66 shifts the valve 69 to energize the cylinders 70 and 72 to raise the lifting yoke 74 of the step-up assembly 26. This causes the unstacking elevator 78 to be lifted to the step-up discharge level (full line position of FIGURE 4), and at the same time causes the cam 92 to strike the one-way switch 90. The latter bleeds through valve 94 to shift the valve 96 to raise the unstacking elevator 78 in the unstacking operation. The cam 98 also engages the actuator 122 to withdraw the pressure plate 102 to permit free passage of the stack.

In the unstacking sequence, the upward movement of the unstacking elevator causes the cam 92 to engage the one-way switch 126 to advance the unloading plate 142. The positioning of the actuator 126 is such that the plate 142 is advanced at a time when it is below the elevation of the stack and elevator 78. At the top of its stroke, the unstacking elevator engages the switch 130 to reverse the movement of the cylinder 80, lowering the stack to the step-up discharge height.

Prior to the low point in the travel of the stack, the cam 92 engages the one-way switch 132 to shift valve 124 and advance the clamping plate 102 to grasp the case next above the first one to be unstacked. The remainder of the stack is supported in elevated position above the engaged case. The lower case continues down with the elevator 78 to the step-up discharge elevation, at which point the cam 92 engages the one-way switch 134 to shift valve 128 to withdraw the unloading plate 142. The plate 142 passes between the edge supports 82 of the unstacking elevator and slides the lowermost case onto the discharge plate 164 at the discharge station 24. This movement of the plate 142 causes the actuators 176 to strike the switches 144, 156. The switch 144 sends the unstacking elevator 78 back up in the unstacking sequence. The switch 156 has no effect because the bleeding poppet 154 in the stack holding assembly 100 remains closed.

On its return stroke, the unstacking elevator engages the lower case of the remaining stack, held by the clamping plates 102, 104, causing the arms 108 to lift to actuate the switch 148 to withdraw the plate 102. This frees the stack for movement with the elevator. From this point the cam sequence is as before, that is, the switch 126 is engaged to extend the unloading plate 142, the switch 130 is engaged to reverse the direction of the unstacking elevator, the switch 132 is engaged to close the clamping plates 102, 104 against the case above the case to be unstacked, and the switch 134 is engaged to retract the unloading plate 142 to withdraw the lowermost case from the stack. This sequence is repeated until the last case reaches the unloading position adjacent the unloading plate 142. However, the switch 132 now sends the clamping plates inwardly of their normal clamping position, causing the actuators 150 to engage the switches 152, 154. The switch 152 locks out the valve 94 rendering the switch 144 inactive to again raise the unstacking elevator. The switch 154 is a bleeding poppet which operates upon movement of the unloading plate into contact with the switch 156 to shift valve 160 causing the assembly 26 to send the entire unstacking elevator 78 down to the dotted line elevation of FIGURE 4.

This completes the cycle as movement of the step-up assembly 26 to its lowermost position again actuates the interlock 63 to send the next stack from the feeding station 20 into the unstacker.

*Straight thru embodiment*

FIGURES 1 to 14 illustrate a machine in which the individual cases are delivered at a convenient working height for various plant operations, such as case filling or inspection. However, in other plant operations, such as case or bottle washing operations, it may be desirable to eliminate this step-up feature and to deliver the individual cases at the inlet level of the stacks. Such construction also has the advantage of simplifying the control system employed to operate the machine.

Referring to FIGURES 15 to 21, a machine is illustrated in which a single conveyor 200 performs the function of delivering stacks of cases to the machine, and conveying individual unstacked cases away from the machine. In other respects the machine is similar to the machine previously described, employing a stack charging or feeding station 220, an unstacking station 222, and a discharge station 224. The stack feeding station 220 can be identical in construction to the previously described station 20, or it can consist of a simplified mechanism in the form of a pivoted case stop 226 operated by the air cylinder 228.

Figure 15:
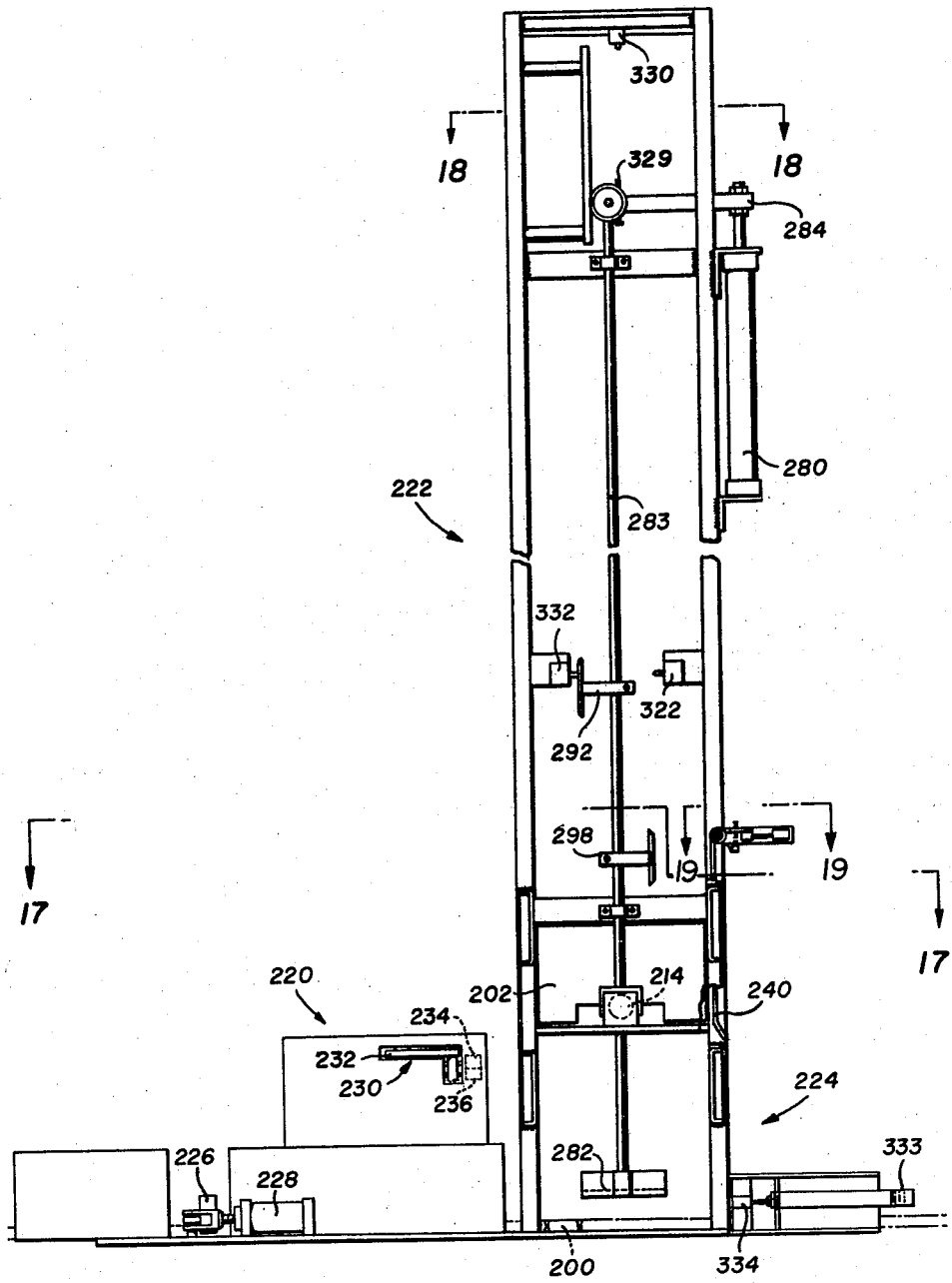
FIGURE 15 is a view in side elevation of another machine embodying the invention.
Figure 16:
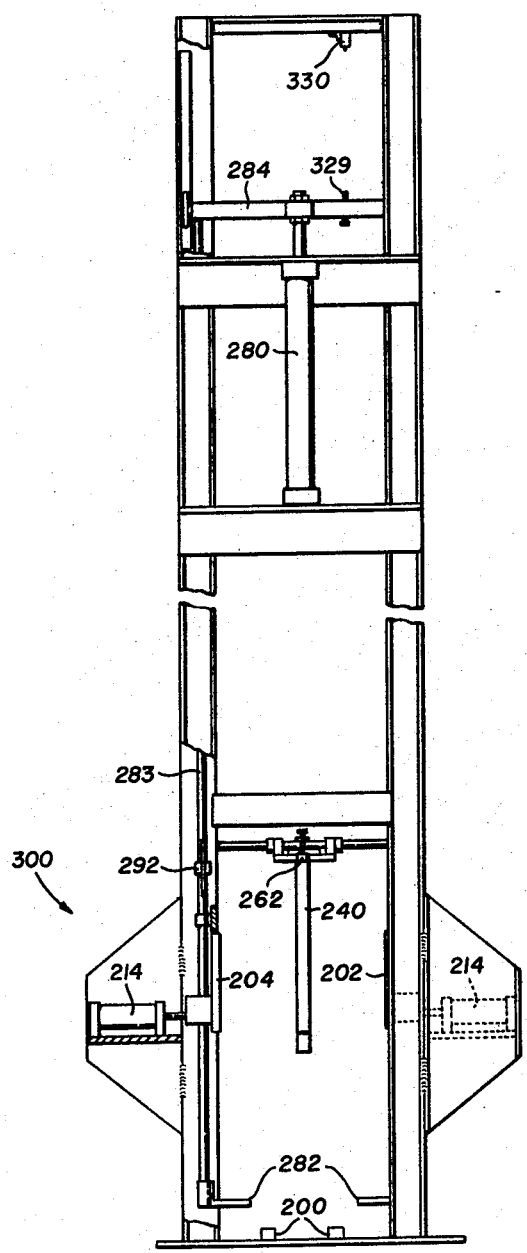
FIGURE 16 is a view in rear elevation thereof.

Referring to FIGURE 15, the stacking sequence is initiated by the movement of a stack of two or more cases into engagement with a touch plate assembly 230. As viewed in FIGURE 18, the assembly 230 includes a pivot plate 232, adapted to be pivoted slightly by the second case in the stack to actuate switches 234 and 236. Switch 234 functions to retract the clamping cylinders 214 within the unstacking station to permit free movement of the stack into the machine. Switch 236 functions to retract the cylinder 228 at the station 220 to pivot the case stop into position to prevent movement of additional stacks into the machine.

Positioning the touch plate assembly 230 at the level of the second case in a stack permits individual cases which may be on the conveyer 200 to pass into the machine without initiating operations at the unstacking station 222.

Movement of a stack of two or more cases into the machine causes an internal actuator or lever 240 to be pivoted forwardly to energize the unstacking elevator 278. This elevator is similar to the elevator previously described and comprises a pair of spaced apart edge supports 282 mounted on vertically extending rods 283 depending from the transverse yoke 284. As will appear, contact of a stack with the lever 240 causes the air cylinder 280 to be actuated by the selector valve 294 on a signal from the switch 290. The function of the switch 290 is similar to that of the switch 90 previously described in that it operates initially to send the unstacking elevator into the unstacking sequence.

Figure 19:
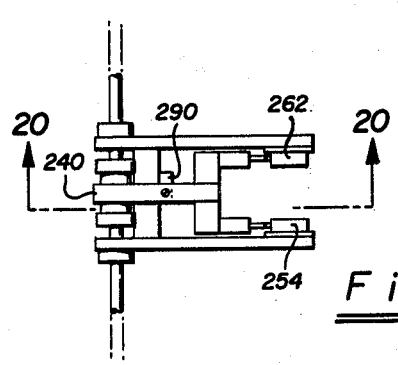
FIGURE 19 is a detail view, along the line 19—19 of FIGURE 15, illustrating an internal actuating mechanism.
Figure 20:
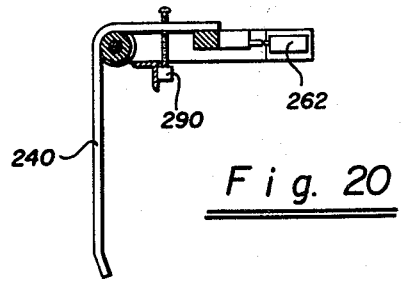
FIGURE 20 is a view in elevation thereof along the line 20—20 of FIGURE 19.
Figure 21:
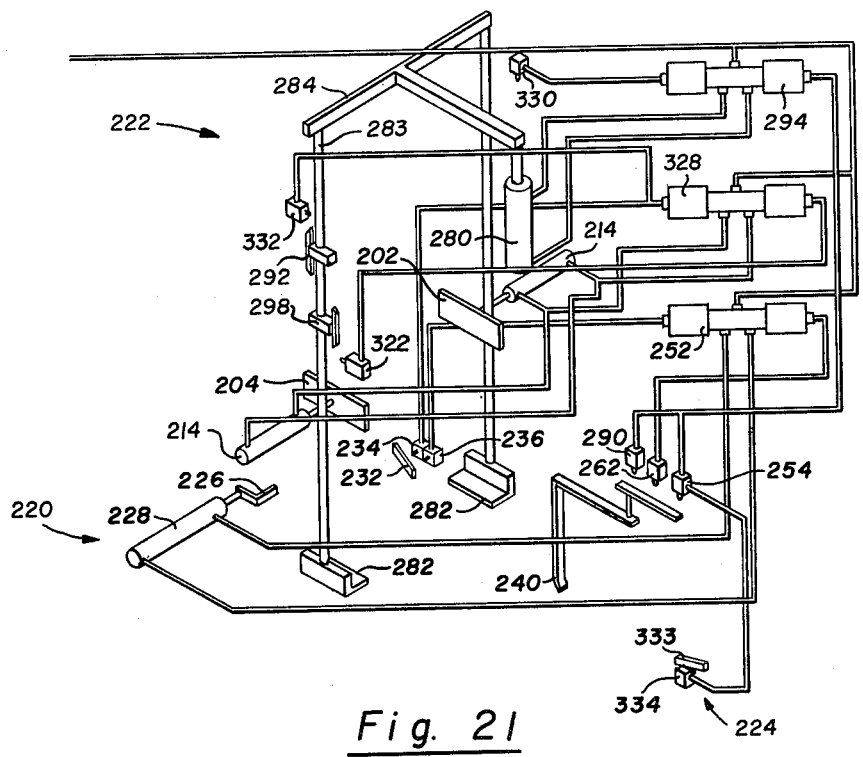
FIGURE 21 is a schematic view like FIGURE 14 illustrating a system of control for the machine illustrated in FIGURE 15.
Figure 18:
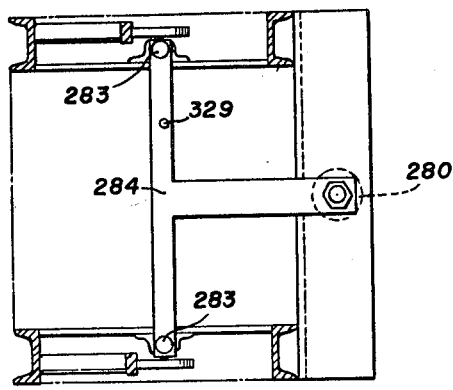
FIGURE 18 is a like view along the line 18—18 of FIGURE 15.

Referring to FIGURES 19 and 20, it can be seen that the lever assembly 240 is normally in engagement with three separate actuator switches, switch 290, switch 254, and switch 262. As indicated, switch 290 serves to raise the stack in the first step of the unstacking operation. As will be later explained, switch 254 normally serves to de-energize actuating switches at the discharge station 224 so that single cases are free to pass through the machine. Switch 262 functions to reverse the selector valve 252, causing the cylinder 228 to retract the stop 226 at the feed station to permit entry of a new case into the unstacking station 222.

In the unstacking sequence, contact with the lever 240 energizes the cylinder 280 to raise the stack within the unstacker. During the upward movement of the unstacking elevator a switch actuator 298 carried by one of the rods 283 serves to depress switch 322. The switch 322 would normally retract the clamping cylinders 214 to withdraw the clamping plates 202, 204. However, since these plates have already been withdrawn by operation of the switch 234, the first contact between the actuator 298 and switch 322 effects no change in the clamping mechanism.

As the unstacking elevator reaches the top of its stroke, an actuator 329 carried by the yoke 284 engages the switch 330 to reverse the movement of the unstacking elevator and send it down to unstacking level. During this latter movement a second switch actuator 292 engages the switch 332 at a point when the lowermost case in the stack is just below the clamping plates 202 and 204. The switch now causes the clamping cylinders 214 to move the plates 202, 204 inward to grasp the second case in the stack, holding this case and the remainder of the stack in elevated position. The lower case continues down with the unstacking elevator 278 until this case is deposited on the conveyor 200 and moved out of the machine. As it leaves the machine, this case engages the actuating lever 333 at the discharge station 224.

Figure 17:
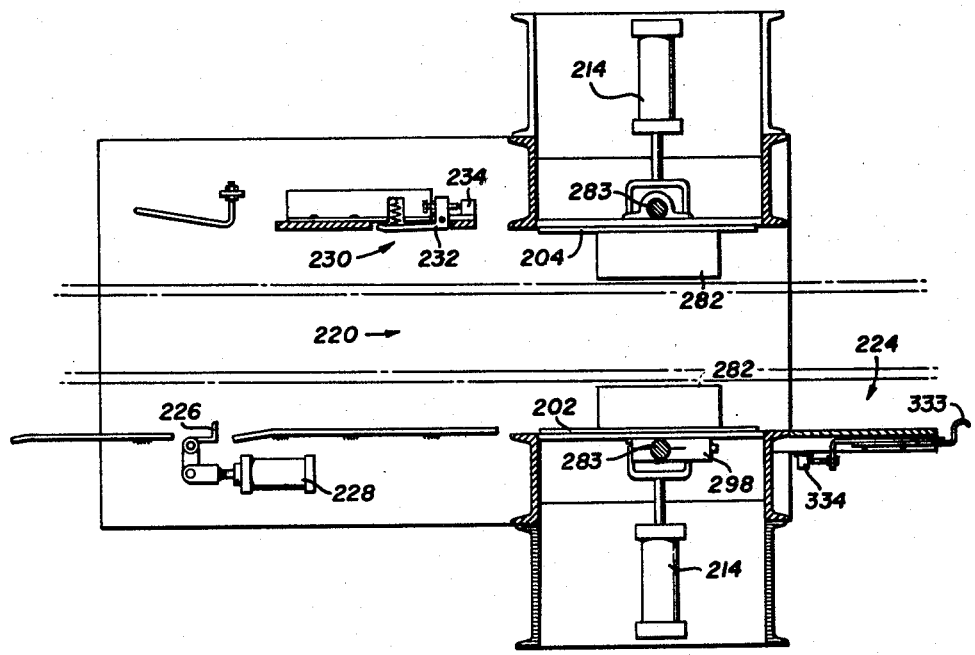
FIGURE 17 is a view in horizontal section along the line 17—17 of FIGURE 15.

Referring to FIGURE 17, the discharge station 224 comprises a lever 333 responsive to the presence of a case on the conveyor 200 to actuate the switch 334. The switch 334 functions to reverse the selector valve 294 to send the unstacking elevator 278 back up in the unstacking sequence.

Upward movement of the unstacking elevator, in response to switch 334, causes the cam actuator 298 to engage the switch 322 at a point just prior to engagement of the edge supports 282 with the lowermost case in the stack being held by the clamp plates 202, 204. The switch 322 energizes the selector valve 294 to open the clamping cylinders, permitting the entire stack to continue upward with the unstacking elevator. At the top of its stroke, the actuator 329 again engages switch 330 to again send the unstacking elevator down. During the downstroke, the actuator 292 again engages the switch 332 to extend the clamping plates to grasp the case in a stack immediately above the lowermost case to be discharged. The latter descends with the unstacking elevator and is deposited on the conveyer 200, causing the switch 334 to again be energized to return the unstacking elevator upward in the unstacking sequence. This operation is repeated until each case in the stack has been deposited separately on the conveyer for discharge.

When the last case in the stack has been deposited on the conveyer 200, the weighting of the lever assembly 240 causes it to return to a normal position so that it engages each of switches 290, 254, and 262. As previously indicated, switch 262 retracts the case stop 226 so that a new stack is fed into the machine by the stacking station 220. Should the station 220 permit a single case to be fed into the machine, the contact of the lever assembly 240 with the switch 254 permits this case to proceed through the machine without energizing the unstacking mechanism upon contact with the lever 333. However, should a stack of two or more cases enter the machine, the positioning of the touch plate assembly 230 and the lever assembly 240 will cause the stack to initiate the unstacking sequence.

The overall operation of the straight thru embodiment, illustrated in FIGURES 15 to 20, can be summarized as follows:

Movement of the last case of a preceding stack out of the unstacking station 222 causes lever 333 to retract the case stop 226 to admit a new stack to the machine. As the stack enters the machine it engages touch plate assembly 230 causing the switch 234 to retract the stack holding assembly 300 (i.e. the clamp plates 202, 204) and switch 236 to again extend the case stop 226 to prevent entry of further stacks or cases into the machine. Within the machine the stack engages the lever assembly 240 causing switch 290 to send the entire stack upward with the stacking elevator 278. At the top of its stroke the stacking elevator actuates switch 330 causing the elevator to reverse its direction of movement. As the stack moves downward, engagement of the actuator 292 with the switch 332 causes the stack holding assembly to grasp the case immediately above the case to be discharged, allowing the latter to move down with the unstacking elevator for deposit on the conveyer 200. The conveyer 200 then carries the discharge case into contact with the lever 333 to again initiate the unstacking sequence. When the last case moves out of the unstacker, movement of the weighted lever assembly into its normal position prevents further energization of the unstacking mechanism by the lever 333. It also signals the feed station 220 to admit another stack to the machine.

I claim:

1. In automatic case unstacking apparatus, an unstacking station including an elevator, hoist means operable to raise and lower said elevator in an unstacking sequence, pressure pads on opposite sides of said elevator, means responsive to upward movement of a stack of cases on said elevator to cause said pads to move apart to permit passage of said stack and elevator, means responsive to and operable during downward movement of said elevator to cause said pads to engage a case in the stack above the case supported by said elevator whereby said case and the portion of the stack thereabove are held in supported position by said pads, and means to discharge the lowermost case from said unstacking elevator.

2. In automatic case unstacking apparatus, an unstacking station including an elevator, hoist means operable to raise and lower said elevator in an unstacking sequence, pressure pads on opposite sides of said elevator, said elevator hoist means and pressure pads being adapted to cooperate with one another in an unstacking sequence, means responsive to upward movement of a stack of cases on said elevator to move said pads apart to permit free passage of said stack and elevator, means responsive to and operable during downward movement of said elevator to cause said pads to engage and support the case next above the lowermost case on the elevator, said pads supporting said case and the remainder of the stack thereabove, means to discharge said lowermost case from the elevator and means responsive to movement of said lowermost case out of the apparatus to send said elevator upward in another unstacking sequence, whereby the cases in said stack are successively unstacked for movement out of said unstacking apparatus.

3. In a fully automatic case unstacking apparatus, a stack retarding and feeding station including a case stop, means to feed one stack at a time past said case stop, an unstacking station including an elevator hoist means operable to raise and lower said elevator in an unstacking sequence, pressure pads mounted on opposite sides of said elevator, said elevator hoist means and pads being adapted to cooperate with one another in an unstacking sequence, means at said unstacking station responsive to upward movement of said stack of cases on said elevator to move said pads apart to permit free passage of said stack and elevator, means at said unstacking station responsive to and operable during downward movement of said elevator to cause said pads to engage and support the case next above the lowermost case on the elevator, said pads supporting said case and the remainder of the stack thereabove, a discharge station including means to discharge the lowermost case from said elevator, and means at said discharge station responsive to movement of said lowermost case out of the unstacking station to send said unstacking elevator upward in another unstacking sequence, whereby the cases in said stack are successively separated and discharged for conveyance to subsequent operations.

4. In a unitary case unstacker adapted for installation at floor level, a stack retarding and feeding station including a case stop, means to feed one stack at a time past said case stop, a step-up assembly including means to receive stacks of cases at floor level from said feeding station and to raise the same to a working level, an unstacking station including an elevator hoist means operable to raise and lower said elevator in an unstacking sequence, pressure pads on opposite sides of said elevator, said elevator hoist means and pressure pads being adapted to cooperate with one another in an unstacking sequence, means responsive to upward movement of a stack of cases on said elevator to move said pads apart to permit passage of said stack and elevator, means responsive to and operable during downward movement of said elevator to cause said pads to engage and support the case next above the lowermost case on the elevator, whereby said case and the remainder of the stack are supported thereabove, a discharge station including means to receive cases at said working level from the unstacking station and to discharge the same for conveyance to subsequent operations, said discharge station including means responsive to movement of a case out of the unstacking station to send said elevator upward in another unstacking sequence, whereby cases in a stack are successively fed to the unstacker and separated and discharged one by one for conveyance away from the unstacker.

5. In a combination case unstacking and conveying mechanism, a feed conveyer, a case retarding and feeding station operatively associated with said feed conveyer, said station including means to feed one case at a time from said station on said feed conveyer, an unstacking station including an elevator, case engaging means associated with said unstacking elevator, means to move said elevator up and down in a substantially continuous unstacking sequence, means responsive to each such downward movement of said elevator to cause said case engaging means to engage and support a case next above the lowermost case as it moves on the elevator, said case engaging means operable during said unstacking sequence to grasp and hold said case and the remainder of the stack in supported position, a discharge conveyer, a discharge station including means to transfer said lowermost case on said unstacking elevator to said discharge conveyer, whereby successive stacks of cases are separated in said unstacking station and deposited as individual cases on said discharge conveyer.

6. In a combination case unstacking and conveying mechanism, a feed conveyer, a stack retarding and feeding station associated with said feed conveyer, said station feeding one stack of cases at a time on said feed conveyer, a step-up assembly including means to receive stacks of cases from said feeding station at floor level and to raise the same to a working level, an unstacking station including an unstacking elevator and case engaging means associated with said unstacking elevator, said unstacking elevator including hoist means operable to raise the lower cases in a stack in a substantially continuous unstacking sequence, means responsive to each lowering movement of said unstacking elevator to cause said case engaging means to engage and support the case next above the lowermost case as is moves on said unstacking elevator, thereby holding said case and the remainder of the stack in supported position above said case, a discharge conveyer at the working level, a discharge station associated with said discharge conveyer, said discharge station including a transfer mechanism operable at each unstacking sequence to move the lowermost case on said unstacking elevator to said discharge station, said discharge station serving to transfer said cases to said discharge conveyer for movement to subsequent operations.

7. Apparatus as in claim 6 wherein said unstacking elevator is supported by said step-up assembly for vertical movements therewith.

References Cited in the file of this patent
UNITED STATES PATENTS

| | | |
|---|---|---|
| 1,632,203 | Threefoot | June 14, 1927 |
| 2,716,500 | Griger | Aug. 30, 1955 |
| 2,769,570 | Adams | Nov. 6, 1956 |
| 2,857,058 | Campbell | Oct. 21, 1958 |
| 2,956,319 | Deakins | Oct. 18, 1960 |
| 3,038,615 | Roth | June 12, 1962 |
| 3,053,402 | Russell | Sept. 11, 1962 |